Aug. 25, 1931.    J. A. BOMBARD ET AL    1,820,430
VENTILATOR
Filed Dec. 4, 1929    2 Sheets-Sheet 1
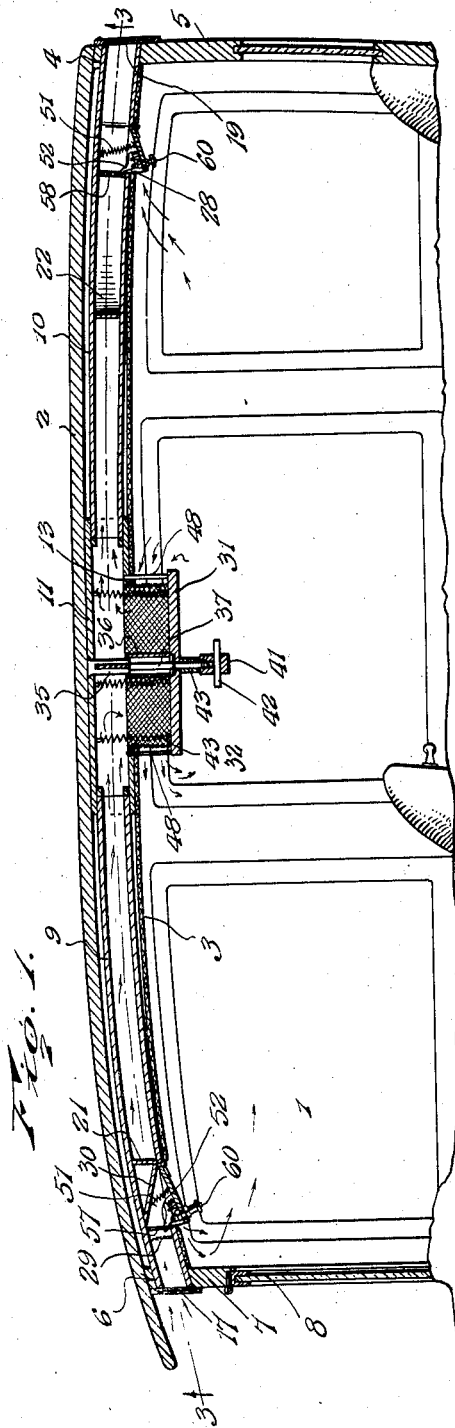
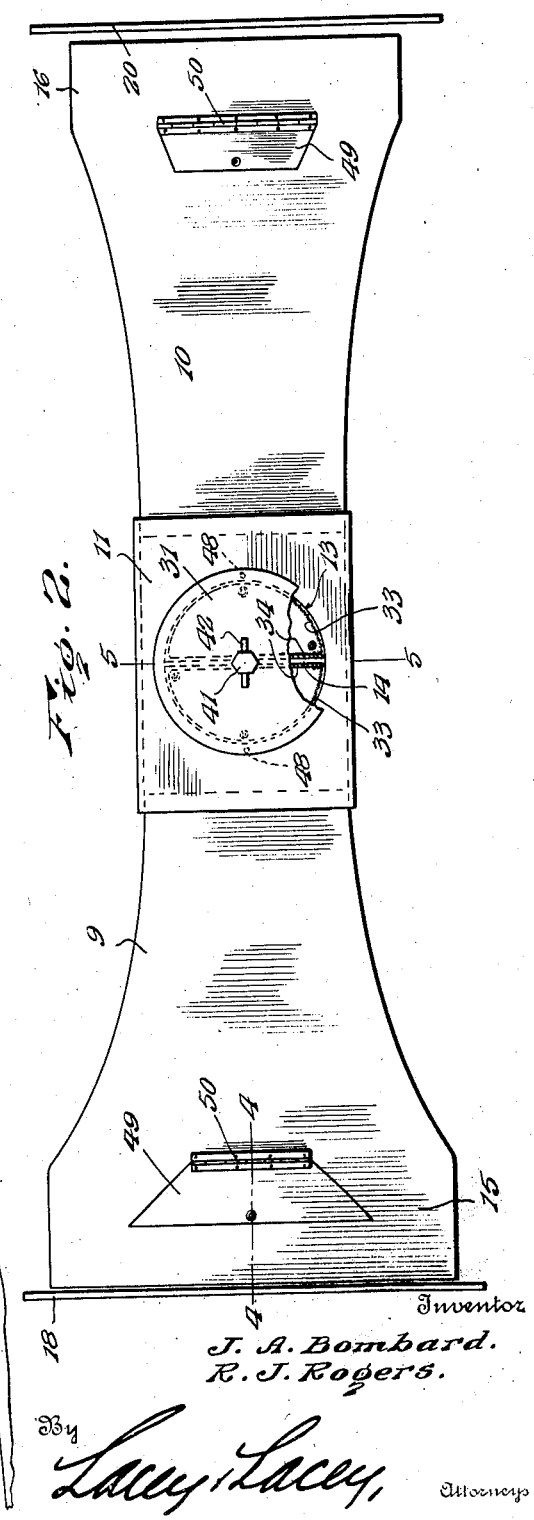
Inventor
J. A. Bombard.
R. J. Rogers.
By Lacy & Lacy,
Attorneys

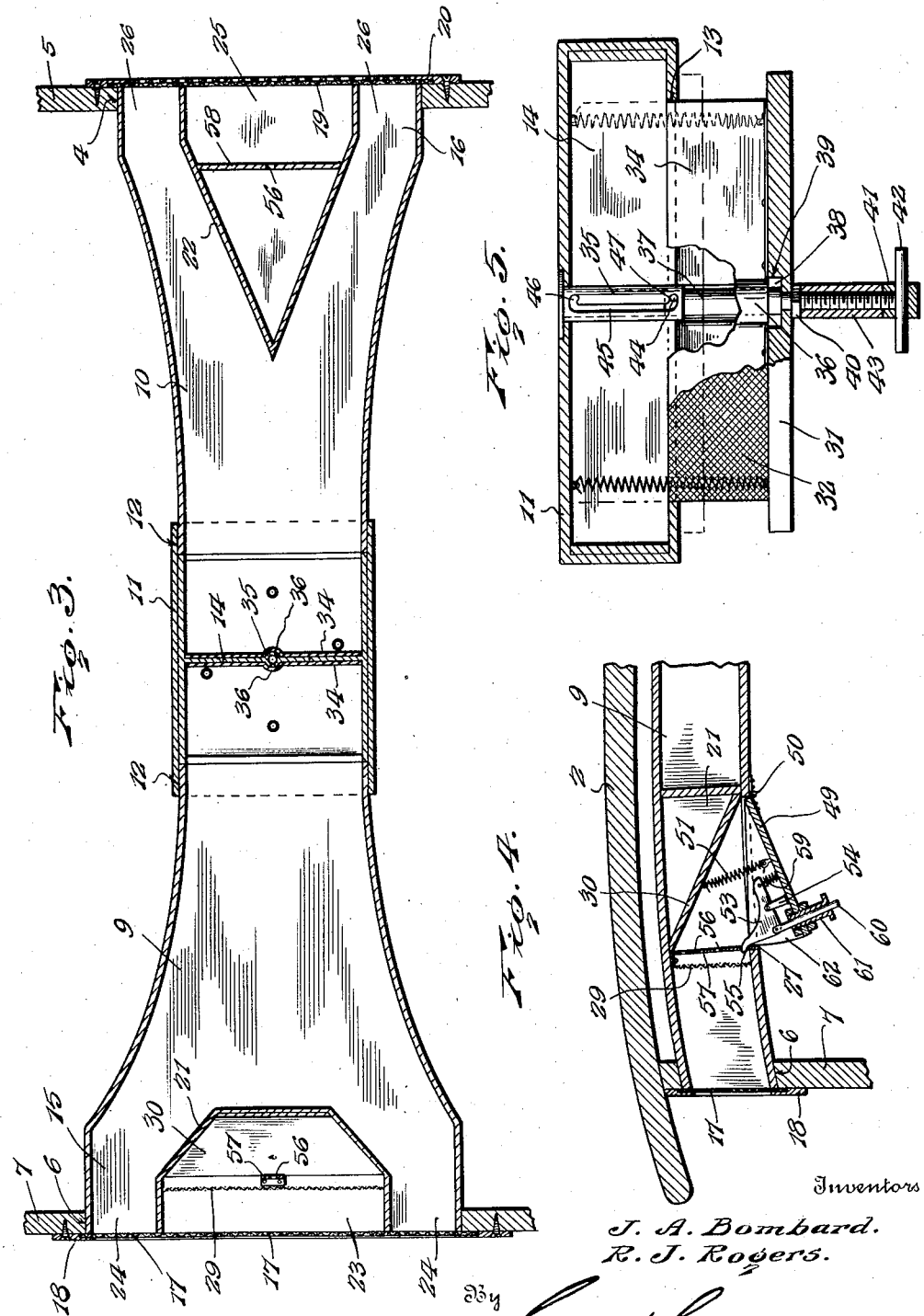

Patented Aug. 25, 1931

1,820,430

UNITED STATES PATENT OFFICE

JOSEPH AUGUSTIN BOMBARD, OF SARANAC LAKE, NEW YORK, AND ROLAND JAMES ROGERS, OF LAGUNA BEACH, CALIFORNIA, ASSIGNORS OF ONE-HALF TO ELIZABETH WHITE DIXON, OF BALTIMORE, MARYLAND

VENTILATOR

Application filed December 4, 1929. Serial No. 411,631.

This invention relates to ventilators and more particularly to a ventilator adapted to be installed in an automobile but it is to be understood that it may be applied to a street car, railroad train or any other vehicle or structure to which it may be found suitable.

One object of the invention is to provide a ventilator which when installed will permit air to enter the interior of a closed automobile from the front and air pass out of the automobile through the back, thereby establishing a very good circulation of fresh air through the automobile and preventing warm or foul air from accumulating therein.

Another object of the invention is to provide a ventilator of such construction that it may be mounted in the upper portion of the automobile body where it will be out of the way or built into the top of the car and thereby rendered inconspicuous so that it will not detract from the appearance of the automobile.

Another object of the invention is to provide the ventilator with control means whereby passage of air through the same into and out of the automobile may be controlled and this air allowed to enter the automobile either at the front or near the center thereof and also cause the air to pass out of the automobile either at the center or rear end. By this arrangement the passage of air into and out of the automobile may be controlled and ventilation thereof permitted without causing drafts through the automobile which might be objectionable to persons riding in certain portions of the same.

Another object of the invention is to permit air to pass into and out of the automobile but at the same time exclude dust and also prevent insects from passing into the automobile through the ventilator.

Another object of the invention is to provide a ventilator formed in sections which may be readily united when the ventilator is installed and thereby allow the ventilator to be shipped in a compact mass and very easily installed.

The invention is illustrated in the accompanying drawings, wherein

Figure 1 is a longitudinal sectional view through an automobile body having the improved ventilator installed therein, Fig. 2 is a view showing the improved ventilator in bottom plan, Fig. 3 is a longitudinal sectional view taken horizontally through the ventilator on the line 3—3 of Fig. 1, Fig. 4 is a sectional view taken on the line 4—4 of Fig. 2, and Fig. 5 is a sectional view taken transversely through the central portion of the ventilator on the line 5—5 of Fig. 2.

This improved ventilator has been illustrated applied to an automobile but, as previously stated, it may be applied to a street or railway car or to any other vehicle or structure for which it is found suitable. In Figure 1, the body portion of the automobile is indicated in general by the numeral 1. This body portion is of a conventional closed car construction and includes the usual top 2 having a lining 3 mounted in spaced relation thereto in any desired manner. In order to install the ventilator, an opening 4 is formed in the back 5 of the body and an opening 6 is formed in the strip 7 extending across the front to support the windshield 8. In view of the fact that the ventilator is mounted between the lining 3 and the top 2, it will be entirely hidden from view except the means for controlling passage of air through the ventilator and, therefore, it will be very inconspicuous and not detract from the appearance of the car. It will be understood that, when the ventilator is applied to freight cars and other vehicles where appearance is of no consideration, it need not be concealed. It will also be understood that the ventilator may be applied at the side of a railway car or other vehicle instead of at the top and, if so applied, it may be disposed either above or below the windows.

This ventilator is formed in sections and consists of a front section 9, a rear section 10 and an intermediate section 11. The intermediate section is of a flat tubular formation and rectangular in cross section and has its end portions reduced in thickness internally, as shown in Figure 3, thereby providing seats 12 to receive the inner ends of the sections 9 and 10 and establish a good connection between these sections. In the under wall of the intermediate section is formed a large opening 13 which is preferably circular but may be of any shape desired and this opening is bisected by a partition 14 which extends the full width of the intermediate section and constitutes a barrier. It will thus be seen that air entering the ventilator through the front section 9 will be directed through the opening 13 into the automobile and air in the automobile may enter the ventilator back of this partition and pass rearwardly through the same. The front and rear sections 9 and 10 are also of a flat tubular formation and rectangular in cross section and these sections increase in width towards their outer ends and terminate in end portions 15 and 16 which are of an even width, as clearly shown in Figures 2 and 3, and fit snugly into the openings formed in the front strip 7 and back 5 of the automobile. A strip of screening 17 covers the outer end of the front section 9 and is secured against the outer surface of the strip 7 by a frame 18 through which screws are passed to firmly hold the frame in place. It will be understood that the strip of screening may be soldered or otherwise secured to the frame, if so desired. A similar strip of screening 19 covers the rear or outer end of the section 10, and in order to secure this screen, there has been provided a grating 20 which fits against the outer surface of the back of the automobile and is secured by screws or other suitable fasteners. A grating or grid is used at the back instead of an open frame as the pressure against the screen 19 is outwardly instead of inwardly and it is desired to prevent danger of this screen being torn loose. By referring to Figure 3, it will be seen that partitions 21 and 22 are disposed in the end sections 9 and 10, thereby providing the front section with an intermediate chamber 23 and passages 24 at opposite sides thereof and the rear section with a similar chamber 25 and side passages 26. Openings 27 and 28 are formed in the bottom walls of the end sections to establish communication between the chambers and the interior of the automobile so that, when control means for the ventilator are properly adjusted, air may enter the automobile near its front end through the chamber 23 and pass out of the same through the chamber 25. A screen 29 is mounted in the chamber 23 as an additional guard against dust which might pass through the screen 17 and a deflector plate 30 is mounted diagonally in the rear portion of this chamber above the opening 27, as shown in Figure 4. so that air entering the chamber will be directed downwardly through the opening 27 into the automobile.

In order to control passage of air through the opening 13 of the intermediate section 11, there has been provided a cap or closure disk 31 of greater diameter than the opening so that it overlaps the lower wall of the intermediate section about this opening when closed. An annular wall 32 formed of screening or other foraminous material is secured to the cap or disk 31 and is of such diameter that it fits snugly within the opening 13. This wall is formed in sections 33, each of which is of a semi-circular formation, as clearly shown in Figure 2, and the strips of wire screening from which these sections are formed have their ends secured against the ends of rigid strips 34 which are preferably formed of sheet metal and extend diagonally across the disk 31 in such spaced relation to each other that the partition or barrier 14 will fit snugly between them. A sleeve or hollow post 35 is disposed intermediate the ends of the partition 14 and the intermediate portions of the plates 34 are bent, as shown at 36, thereby forming a sleeve fitting snugly about the post. A stem 37 extends centrally through the cap or disk 31 and this stem carries a disk 38 seated in a recess or pocket 39 formed in the inner face of the disk. The outer portion of the stem which extends through the disk 31 is threaded and carries a securing nut 40 which is disposed close to the cap in order to retain the stem in a set position relative to the cap but at the same time allow the stem to be turned in the opening of the cap through which it passes. A head 41 carrying a handle bar 42 is screwed tightly upon the outer end of the stem and between this head and the nut 40 is provided a spacer 43. It will thus be seen that by grasping the head and handle bar the stem may be turned in the post and slid longitudinally in order to move the cap or closure to an open or closed position. A pin 44 extends from the inner end of the stem for engagement in a slot 45 formed longitudinally of the post and the ends of this slot are offset, as shown in Figure 5, thereby providing seats 46 and 47 adapted to receive the pin and retain the closure in an opened or closed position. It will thus be seen that the cap may be very easily moved to either an opened or a closed position and firmly secured in either of these positions. Guide pins 48 may be provided at opposite sides of the closure disk 31 and engaged through openings formed in the under wall of the intermediate section in order to guide movement of the closure and prevent danger of transverse movement which might bend the stem or post. It will be understood that any number of these pins 48 may be provided.

In order to control movement of air through the openings 27 and 28, there has been provided doors 49 which are hingedly mounted, as shown at 50, so that they may be swung to an opened position against the action of springs 51 which normally retain the doors closed. Each of these doors is provided with a latch whereby it may be secured in a closed position or held in either a partially or entirely opened position. These latches are indicated in general by the numeral 52 and each is of the construction shown in Figure 4. Referring to this figure, it will be seen that the latch includes a pawl 53 which is pivotally mounted upon a post or fulcrum 54 and having a tooth 55 at its front end to engage in a selected one of the openings 56 which may be formed either in a narrow strip or rack bar 57, as shown at the front of Figure 3, or in a partition 58 which extends across the rear chamber 22. A spring 59 is provided between the doors and the heel or rear end of the pawl in order to yieldably hold the pawl in position to enter an opening, and in order to move the pawl to retract its tooth or bill 55, there has been provided a plunger 60 which extends through the bore of a knob 61 by means of which the door may be grasped and moved to an opened position. It will be readily seen that, when the knob 60 is grasped to open the door and pressure applied to the outer end of the plunger, the pawl will be rocked against the action of its spring and the tooth or bill of the pawl retracted from the opening 56 in which it is engaged. The door may then be swung either partially or fully opened and the plunger then released so that the pawl may enter another opening and secure the door in the opened position. When it is desired to partially or fully shut the door, the knob and plunger are again engaged in order to release the latch and the door can then be partially or fully closed and it will be retained in the closed position by the latch. Side flanges or walls 62 may be provided upon the doors in order to direct movement of air through the openings 27 and 28 but these may be omitted if so desired and, in fact, it is preferred to only have the door for the opening 27 at the front of the ventilator provided with these flanges.

When this ventilator is installed, openings 4 and 6 are formed in the back and front of the automobile and after the outer ends of the front and rear sections have been engaged in the openings the two sections are moved outwardly a sufficient distance to allow the intermediate section to be set in place. The end sections are then moved inwardly until their inner ends are engaged in the ends of the intermediate section, after which any suitable means may be provided to secure the sections firmly against the top of the automobile or the lining 3 may be depended upon to retain the ventilator in its proper position. If it is desired to have the air enter and leave the automobile at both the central portion thereof and also at its front and rear ends, the closure for the central opening 13 will be opened and also the front and rear doors. Air passing inwardly through the front end of the ventilator will pass through the chamber 23 and also the side passages 24 and this air will be directed downwardly into the automobile close to its front through the opening 27 and will also enter the automobile through the opening 13 in front of the barrier or partition 14. Movement of the automobile will create a suction through the rear section and air will pass outwardly through the opening 13 at the rear of the partition and also through the rear opening 28. This is clearly indicated by arrows in Figure 1. By closing the doors 49 the air may be only allowed to pass into and out of the automobile through the front and rear portions of the central opening, thereby eliminating drafts at the front and rear of the automobile or the closure for the central opening may be shut and the doors of the front and rear openings opened. When this is done, the air will enter the automobile close to its forward end and after passing through the automobile will leave by way of the opening 28. It will thus be seen that passage of air through the automobile can be very well controlled.

Having thus described the invention, we claim:

1. A ventilator comprising a tubular body open at its ends and having an opening intermediate its length and other openings adjacent its front and rear ends, a partition extending transversely through said body in bisecting relation to the center opening and dividing the body into front and rear portions and the center opening into an outlet for the front portion and an inlet for the rear portion, and partitions in end portions of the body defining chambers of less width than the body, the chambers being open at their outer ends and the openings near the ends of the body communicating with the chambers.

2. A ventilator comprising a tubular body having an opening intermediate its length and other openings adjacent its front and rear ends, a partition extending transversely through said body in bisecting relation to the center opening and dividing the body into front and rear portions and the center opening into an outlet for the front portion and an inlet for the rear portion, the opening adjacent the front end of said body constituting an outlet and the opening near its rear end an inlet, partitions in the end portions of said body dividing each end into side passages and a chamber between the same opening through the ends of the body and end openings thereof, and closures for the intermediate and end openings of the body movable into and out of closing relation thereto.

3. A ventilator comprising a tubular body having an opening intermediate its length and other openings adjacent its front and rear ends, a partition extending transversely through said body in bisecting relation to the center opening and dividing the body into front and rear portions and the center opening into an outlet for the front portion and an inlet for the rear portion, the opening adjacent the front end of said body constituting an outlet and the opening near its rear end an inlet, partitions in the end portions of said body dividing each end into side passages and a chamber between the same communicating with an end opening of the body and open at its outer end, a baffle in the chamber at the front end of said body for directing air through the front opening, and closures for said openings movable to adjusted positions and adapted to be releasably secured in set positions.

4. A ventilator comprising a tubular body having an opening intermediate its length and other openings adjacent its front and rear ends, a partition extending transversely through said body in bisecting relation to the center opening and dividing the body into front and rear portions and the center opening into an outlet for the front portion and an inlet for the rear portion, the opening adjacent the front end of said body constituting an outlet and the opening near its rear end an inlet, and closures movable into and out of closing relation to said openings, the closure for the center opening consisting of a disk of greater dimensions than the said opening, spaced plates carried by said disk and fitting against side faces of said partition, perforated walls secured to said disk and the ends of said plates and having snug engagement with margins of said opening, and adjusting means for the closure carried by said disk and adjustably engaged with said partition.

5. A ventilator comprising a tubular body having an opening intermediate its length and other openings adjacent its front and rear ends, a partition extending transversely through said body in bisecting relation to the center opening and dividing the body into front and rear portions and the center opening into an outlet for the front portion and an inlet for the rear portion, the opening adjacent the front end of said body constituting an outlet and the opening near its rear end an inlet, and closures movable into and out of closing relation to said openings, the closure for the center opening consisting of a disk of greater dimensions than the said opening, spaced plates carried by said disk and fitting against side faces of said partition, perforated walls secured to said disk and the ends of said plates and having snug engagement with margins of said opening, a post intermediate the ends of said partition formed with a longitudinally extending track having offset portions, and a stem rotatably carried by said disk and slidably engaged with said post and provided with a pin engaged in said track whereby the closure may be moved to an adjusted position when the stem is grasped by its outer end and the stem then turned to seat its pin in offset portion of the track and releasably hold the closure in a set position.

6. A ventilator comprising a tubular body having an opening intermediate its length and other openings adjacent its front and rear ends, a partition extending transversely through said body in bisecting relation to the center opening and dividing the body into front and rear portions and the center opening into an outlet for the front portion and an inlet for the rear portion, the opening adjacent the front end of said body constituting an outlet and the opening near its rear end an inlet, and closures movable into and out of closing relation to said openings, the closure for each end opening consisting of a door hinged to said body for movement into and out of a closed position, a handle for said door, a latch pivotally connected with said door and yieldably held in an operative position, a rack in said body engageable by said latch to hold the door in a set position, and an actuating stem for said latch slidably passed through said handle and projecting outwardly therefrom.

7. A ventilator comprising a tubular body having an intermediate section and front and rear end sections, the end sections having their inner ends in telescoping engagement with ends of the intermediate section, said intermediate section having one wall formed with an opening and the end sections each being formed with an opening adjacent its outer end, a partition in said intermediate section dividing the same into end portions and bisecting the opening therein to define an outlet for the front portion and an inlet for the rear portion of the intermediate section, and closures for said openings movable into and out of closing relation thereto.

8. A ventilator comprising a tubular body having an intermediate section and front and rear end sections, the end sections having their inner ends in telescoping engagement with ends of the intermediate section, said intermediate section having one wall formed with an opening and the end sections each being formed with an opening adjacent its outer end, a partition in said intermediate section dividing the same into end portions and bisecting the opening therein to define an outlet for the front portion and an inlet for the rear portion of the intermediate section, partitions in the outer end portions of said end sections dividing the outer end of each into side passages and a chamber between the passages open at its outer end and communicated with through the opening adjacent the end of the section, and closures for the intermediate and end openings movable into and out of closed positions.

9. A ventilator comprising a tubular body having an intermediate section and front and rear end sections, the end sections having their inner ends in telescoping engagement with ends of the intermediate section, said intermediate section having one wall formed with an opening and the end sections each being formed with an opening adjacent its outer end, a partition in said intermediate section dividing the same into end portions and bisecting the opening therein to define an outlet for the front portion and an inlet for the rear portion of the intermediate section, partitions in the outer end portions of said end sections defining chambers of less width than the body and being open at their outer ends and communicated with through the openings near the outer ends of the end sections, and adjustable closures for the intermediate and end openings whereby passage of air through the body may be controlled.

10. A ventilator comprising an open-ended body having independent air passages extending through the same and at their inner ends openings through a side of the body intermediate the length thereof, said body having other air passages in its end portions opening through ends of the body and at their inner ends opening through a side of the body near its ends, and means to control flow of air through the body.

11. A ventilator comprising a body having independent air passages extending through the same, said passages having their outer ends opening through opposite ends of the body and each having its inner end opening through a side of the body intermediate the length thereof, other air passages being formed in the body with their outer ends opening through opposite ends of the body intermediate the width thereof and each having its inner end opening through a side of the body near an end of the body, and closures for the inner ends of said passages movable into and out of closing relation thereto.

12. A ventilator comprising a body having independent air passages extending through the same, said passages having their outer ends opening through opposite ends of the body and each having its inner end opening through a side of the body partitions in the outer portions of said air passages dividing the same into side passages and defining chambers between the side passages open at their outer ends, the body having side openings formed therein communicating with the inner ends of said chambers and together therewith constituting auxiliary air passages, and closures for the inner ends of all of said passages movable into and out of closed positions.

13. A ventilator comprising a body having independent air passages extending longitudinally thereof with their outer ends opening through ends of the body and each having its inner end opening through a side of the body intermediate the length thereof, other air passages being formed in end portions of the body longitudinally thereof with their outer ends opening through ends of the body and each having its inner end opening through a side of the body, a common closure for the inner ends of the first air passages movable into and out of a closed position, and separate closures for the inner ends of the last-mentioned air passages independently movable into and out of closed positions.

14. A ventilator comprising a body having independent air passages extending longitudinally thereof with their outer ends opening through ends of the body and each having its inner end opening through a side of the body intermediate the length thereof, end portions of said body having chambers formed therein dividing end portions of said air passages into spaced mouths, said chambers opening through the ends of the body and each having its inner end opening through a side of the body, and closures for the inner ends of said air passages and chambers movable into and out of a closed position.

In testimony whereof we affix our signatures.

ROLAND J. ROGERS. [L. S.]
JOSEPH AUGUSTIN BOMBARD. [L. S.]